Aug. 21, 1951     G. SHIEBERL     2,564,819
WINDSHIELD WIPER ARM
Filed Oct. 12, 1948
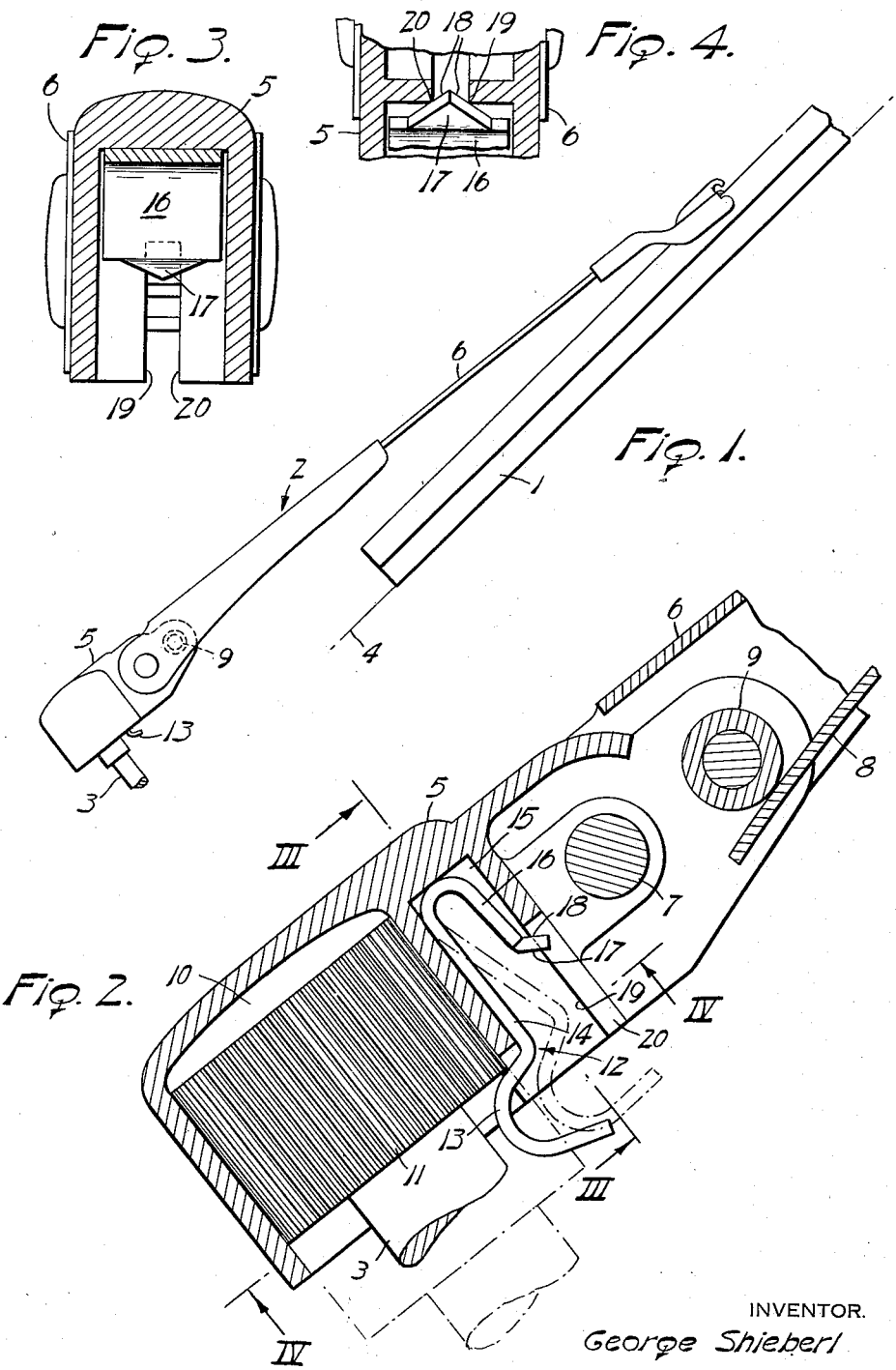
INVENTOR.
George Shieberl
BY Bean, Brooks, Buckley & Bean
ATTORNEYS.

Patented Aug. 21, 1951

2,564,819

UNITED STATES PATENT OFFICE 2,564,819

WINDSHIELD WIPER ARM

George Shieberl, Buffalo, N. Y., assignor to Trico Products Corporation, Buffalo, N. Y.

Application October 12, 1948, Serial No. 54,186

5 Claims. (Cl. 287—53)

This invention relates to the windshield cleaning art and more especially to the wiper carrying arm and its attachment to the actuating shaft. Specially designed means have heretofore been devised to facilitate the mounting of the wiper arm and securing it firmly to the shaft in a practical manner, such as is disclosed in copending application Serial No. 586,117, now Patent No. 2,511,129, issued June 13, 1950.

The primary object of the present invention is to accomplish this arm mounting more economically while maintaining the advantages of such securement.

The foregoing and other objects will manifest themselves as this description progresses, reference being made therein to the accompanying drawing wherein:

Fig. 1 is a side elevation of the improved wiper arm in use;

Fig. 2 is a fragmentary sectional view enlarged to clarify the inventive disclosure;

Figs. 3 and 4 are cross sectional views taken about on lines 3—3 and 4—4 of Fig. 2.

Referring more particularly to the drawing, the numeral 1 designates a wiper or wiping blade, 2 its carrying arm, and 3 its actuating shaft by which the wiper is moved back and forth across the windshield surface designated by the numeral 4. The arm may be of any desired construction, the one herein depicted having a shaft mounted inner section 5 and a wiper attached outer section 6 pivotally joined by a pin 7, with the outer section being urged toward the surface by a spring 8 which finds support on a bearing 9 on the inner section. The arm has a socket 10 interlockingly receiving a knurled or fluted head 11 on the shaft 3, the interlock being secured by a latch 12. As in the earlier application the latch is carried by the arm and has a keeper part 13 overhanging the head to prevent accidental or unauthorized displacement of the arm. The mounting shank 14 for the latch fits within a chamber or pocket 15 in the arm and has a return bend 16 constituting an anchor means.

In the earlier disclosure the anchor necessitated a careful preliminary formation to insure a prescribed location of the catch or keeper 13 on the arm. In the present disclosure the construction is better suited for mass methods of production and insures uniformity in results.

Accordingly, the anchor part 16 is formed with a spring tongue 17 which is selectively engageable in the pocket at the desired depth to insure the proper positioning of the catch 13 relative to the shaft head 11. This selective engagement is effected by having the tongue interlock with the pocket wall at multiple points. Herein, the tongue has biting engagement with the pocket wall as by providing converging corner edges 18 for cooperative engagement with spaced shoulders 19.

By this arrangement the latch may be pushed more or less fully into the pocket so as to have the catch 13 tightly engage the head and thereby preclude looseness in the mounting of the arm. Should the latch be anchored too deep in the pocket access is given to the biting engagement through a slot 20 by which the tongue may be sprung away from the shoulder 19 to enable the latch being lifted out for readjustment.

The foregoing description has been given for clarity and not by way of limitation since the inventive principles involved are capable of assuming other physical embodiments without departing from the spirit of the invention and the scope of the appended claims.

What is claimed is:

1. A wiper arm having a shaft receiving socket and an adjacent latch containing chamber opening side by side through one face thereof, and a latch having a keeper part overhanging the side wall of the socket for engaging a shoulder on an actuating shaft, the latch having a supporting shank of flat spring stock shaped with a return bend to provide an anchoring portion in the form of a spring tongue, the chamber being formed with spaced shoulders and said tongue having a sharp projection between the spaced shoulders bearing thereupon and biting into at least one shoulder at any selected point thereon for securing the latch in the socket.

2. A wiper arm having a shaft receiving socket and an adjacent latch containing chamber opening side by side through one face thereof, and a latch having a keeper part overhanging the side wall of the socket for engaging a shoulder on an actuating shaft, the latch having a supporting shank with a return bend portion terminating in a deflected sharp pointed tongue, the wall of the chamber being provided with spaced parallel shoulders extending inwardly and between which said pointed tongue extends for selective biting engagement with both shoulders.

3. A wiper arm having a shaft receiving socket and an adjacent latch containing chamber opening side by side through one face thereof, and a latch having a keeper part overhanging the side wall of the socket for engaging a shoulder on an actuating shaft, the chamber wall having parallel sharp corners and the latch having a supporting shank in the chamber, formed with a return bend terminating in a laterally projecting point with converging biting edges for biting into the spaced corners of the chamber wall.

4. A wiper arm having a shaft receiving socket and an adjacent latch containing chamber opening side by side through one face thereof, and a latch having a keeper part overhanging the side wall of the socket for engaging a shoulder on an actuating shaft, the latch having a supporting shank engaging in the chamber, the chamber having spaced corner edges extending inwardly, and the shank having a resiliently mounted anchor part with a biting edge selectively engageable with and between the corner edges for adjustably securing the latch in the chamber.

5. A wiper arm having a shaft receiving socket and an adjacent latch containing chamber opening side by side through one face thereof, and a latch having a keeper part overhanging the side wall of the socket for engaging a shoulder on an actuating shaft, the latch having a supporting shank engaging in the chamber, the chamber having spaced corner edges extending inwardly, the shank having a return bend in the form of a spring tongue, the free end of the tongue having converging biting edge portions selectively engageable with the corner edges for adjustably securing the latch in position.

GEORGE SHIEBERL.

REFERENCES CITED

The following references are of record in the file of this patent:

UNITED STATES PATENTS

| Number | Name | Date |
|---|---|---|
| 2,154,537 | Stenberg | Apr. 18, 1939 |
| 2,252,855 | Lasch | Aug. 19, 1941 |